Patented June 23, 1942

2,287,106

UNITED STATES PATENT OFFICE 2,287,106

HOMOLOGUES OF DL-TOCOPHEROLS

Paul Karrer, Zurich, Switzerland, assignor to Hoffmann-La Roche Inc., Nutley, N. J., a corporation of New Jersey No Drawing. Application February 19, 1940, Serial No. 319,767. In Switzerland March 8, 1939

5 Claims. (Cl. 260—333)

dl-Tocopherols, i. e., compounds exerting a vitamin E action, can be obtained by condensing methyl-substituted derivatives of hydroquinone with phytol or derivatives thereof (Helvetica Chimica Acta, vol. 21, year 1938, page 524 and page 1234; Nature, vol. 142, year 1938, page 36).

As a further development of this method it has now been found that homologues of dl-tocopherols can be prepared by reacting phytol or derivatives thereof, preferably in presence of acid condensing agents, with alkyl-substituted derivatives of hydroquinone, in which the alkyl groups consist partly of methyl groups, partly of ethyl groups or exclusively of ethyl groups. For carrying out the process phytol itself as well as derivatives thereof, such as, for instance, phytyl-mono- or dihalides, or isophytol can be employed.

In biological tests the new compounds obtained in accordance with the present invention are capable of exerting the action of vitamin E. They are to be employed in the manufacture of medicinal preparations.

Example 1

1.7 parts by weight of 2-ethyl-3,5-dimethyl-hydroquinone and 4.5 parts by weight of phytyl bromide are heated for 1 hour in 20 parts by weight of dry benzine with about 1 part by weight of zinc chloride on a water bath. The reaction mixture is agitated first with water, then with dilute alkali and again with water, and the benzine layer dried. This layer contains the reaction product which is purified by chromatographic adsorption on aluminium oxide. Thereby the resulting hydroxychromane remains in the upper adsorption zones and can thereafter be eluted by a mixture of methanol and ether. The 2,5,7-trimethyl-8-ethyl-2-(4′,8′,12′-trimethyl-tridecyl)-6-hydroxychromane of the formula

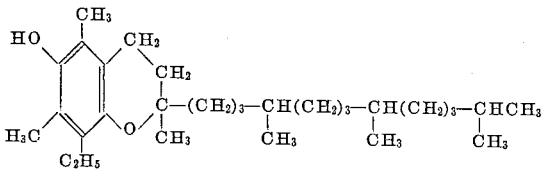

is a viscous oil which reduces silver and gold salt solutions already in the cold; it has a characteristic absorption spectrum at about 295 m$\mu$ and an absorption minimum at about 256 m$\mu$, and forms a well developed crystalline allophanate melting at 170–171° C.

Example 2

1.7 parts by weight of 3,5-diethyl-hydroquinone, 4.8 parts by weight of phytyl bromide, 1 part by weight of anhydrous zinc chloride and 30 parts by weight of dry benzine are heated for 1½ hours on a water bath. After successive shaking of the reaction mixture with water, alkali and water, the benzine layer is dried. The condensation product contained in the latter is purified by adsorption on aluminium oxide. The reaction product, namely, the 2-methyl-5,7-diethyl-2-(4′,8′,12′-trimethyl-tridecyl)-6-hydroxychromane of the formula

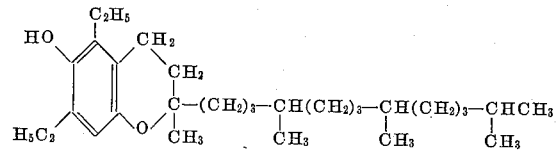

is obtained by elution with a mixture of methanol and ether in the form of a slightly coloured viscous oil having a strong reducing power. The compound has an absorption maximum at about 290 m$\mu$ and an absorption minimum at 255 m$\mu$.

Example 3

2.5 parts by weight of 2-ethyl-3,5-dimethyl-hydroquinone, 4 parts by weight of phytol and 1 part by weight of anhydrous zinc chloride are heated to 180° C. with stirring for half an hour in a stream of carbon dioxide. Thereby the suspension turns into a homogeneous brown fused mass. It is allowed to cool, water and ether are added while continuing the stirring. The ether solution is separated, washed with water, a solution of caustic soda, hydrochloric acid and water, dried and the solvent evaporated. The extract is dissolved in petroleum ether and adsorbed on an aluminium oxide column. The chromatogram is developed with a large quantity of petroleum ether. The upper homogeneous grey zone contains the desired condensation product which can be eluted with a mixture of methyl alcohol and ether. The 5,7-dimethyl-8-ethyl-tocol is a yellowish oil which is identical with the product obtained in accordance with Example 1.

I claim:

1. A homologue of the dl-tocopherols of the formula

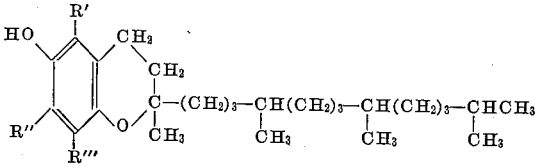

wherein at least one of the radicals R', R'', R''' is an ethyl group, R' and R'' are selected from the group consisting of a methyl and an ethyl group, and R''' is selected from the group consisting of hydrogen, a methyl and an ethyl group.

2. A homologue of the dl-tocopherols of the formula

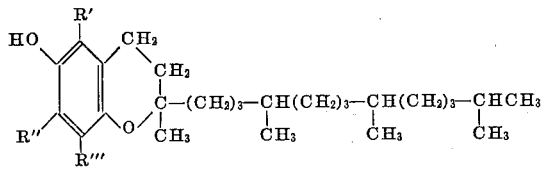

wherein at least one of the radicals R', R'', R''' is an ethyl group and the other two are selected from the group consisting of a methyl and an ethyl group.

3. A homologue of the dl-tocophenols of the formula

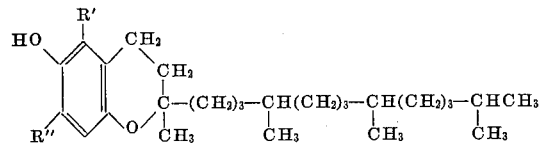

wherein at least one of the radicals R' and R'' is an ethyl group and the other is selected from the group consisting of a methyl and an ethyl group.

4. The 2,5,7-trimethyl-8-ethyl-2-(4',8',12'-trimethyl-tridecyl)-6-hydroxychromane of the formula

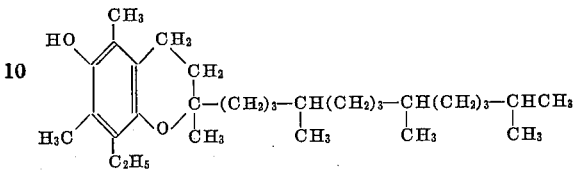

5. The 2-methyl-5,7-diethyl-2-(4',8',12'-trimethyl-tridecyl)-6-hydroxychromane of the formula

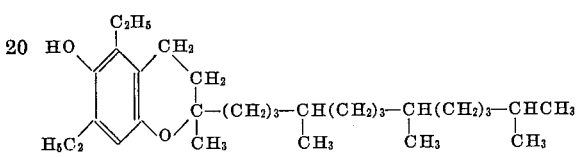

PAUL KARRER.